United States Patent
Kondo et al.

(10) Patent No.: US 6,292,590 B1
(45) Date of Patent: Sep. 18, 2001

(54) DYNAMIC CODING WITH EXCHANGING PIXELS

(75) Inventors: Tetsujiro Kondo, Tokyo; Takashi Horishi, Kanagawa, both of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/574,041

(22) Filed: May 18, 2000

Related U.S. Application Data

(63) Continuation of application No. PCT/JP99/05168, filed on Sep. 21, 1999.

(30) Foreign Application Priority Data

Sep. 21, 1998 (JP) .................................. 10-266986

(51) Int. Cl.[7] .................... G06K 9/36; H04B 1/66
(52) U.S. Cl. .................. 382/239; 382/251; 375/240.02; 375/240.03
(58) Field of Search .................... 382/239, 232, 382/251, 237; 358/433; 375/240.24, 240.01, 240.02, 240.03; 348/421, 420, 390, 384

(56) References Cited

U.S. PATENT DOCUMENTS

| | | | |
|---|---|---|---|
| 4,710,801 | 12/1987 | Kondo | 348/639 |
| 5,049,990 | * 9/1991 | Kondo et al. | 375/240.24 |
| 5,107,519 | 4/1992 | Ishikawa | 348/409 |
| 5,274,466 | * 12/1993 | Ida et al. | 382/249 |
| 5,825,313 | * 10/1998 | Kondo et al. | 375/240.24 |
| 5,883,976 | * 3/1999 | Ohsawa | 382/232 |
| 6,028,961 | * 2/2000 | Shimomura | 382/239 |

FOREIGN PATENT DOCUMENTS

| | | | |
|---|---|---|---|
| 59-153378 | 9/1984 | (JP) | H04N/1/41 |
| 1-135281 | 5/1989 | (JP) | H04N/7/137 |

OTHER PUBLICATIONS

"New ADRC for consumer digital VCR," T. Kondo et al., 8th International Conference on Video, Audio and Data Recording, 1990, pp. 144–150.*

"Block adaptive quantization of images," P. Monet et al., IEEE Transactions on Communications, vol. 41, No. 2, Feb. 1993, pp. 303–306.*

* cited by examiner

Primary Examiner—Wenpeng Chen
(74) Attorney, Agent, or Firm—Frommer Lawrence & Haug, LLP; William S. Frommer

(57) ABSTRACT

In ordinary encoding operations, edges are disadvantageous in terms of compression because of the large amount of information involved there so that distorted and unbalanced quantization can occur as a result of encoding. Thus, in a coding apparatus according to the invention, the blocking section divided the image data into blocks. The quantity of information computing section computationally determines the quantity of information for coding the image data of each block. The pixel exchange section causes the block for which the quantity of information is computed by the quantity of information computing section and an arbitrarily selected block to exchange pixels. The controller compares the quantity of information of the block where pixels are switched by the pixel exchange section and the quantity of information of the block before the pixel exchange and determines the block to be sent to the quantizing section according to the outcome of the comparison. The quantizing section carries out an ADRC quantizing operation on the block sent from the pixel exchange section. The multiplexing section adds the ADRC quantization data to the coded data for multiplexing.

25 Claims, 7 Drawing Sheets

DYNAMIC CODING WITH EXCHANGING PIXELS

This is a continuation of copending International Application PCT/JP99/05168 having an international filing date of Sep. 21, 1999.

TECHNICAL FIELD

This invention relates to a coding device and a coding method for encoding an image on the basis of unit blocks and also to a decoding device and a decoding method for decoding image data encoded also on the basis of unit blocks. The present invention also relates to a recording medium carrying programs that are recorded thereon so as to be executed by an information processing apparatus for such encoding and decoding operations.

BACKGROUND ART

With conventional coding techniques using blocks, a neighbouring block is defined on the basis of self correlation of an image and the encoding operation is conducted on a policy of eliminating redundancy within the block. Various shapes are found when evaluating an image by means of neighbouring blocks, including those for plane areas and those for edges.

In ordinary encoding operations, while redundancy may be eliminated with ease from plane areas in order to compress the data to a large extent, edges are disadvantageous in terms of compression because of the large amount of information involved there so that distorted and unbalanced quantization can occur as a result of encoding. While the resultant degradation of the image quality may be unrecognizable in certain occasions due to the masking effect of the sight, an increased amount of information has to be used to alleviate the degree of visual degradation.

DISCLOSURE OF THE INVENTION

In view of the above identified circumstances, it is therefore an object of the present invention to provide a coding apparatus and a coding method that can raise the level of correlation in a block to reduced the amount of information necessary for coding.

Another object of the invention is to provide a decoding apparatus and a decoding method that can decode image data encoded on the basis of unit blocks in a simple fashion.

According to the invention, there is provided a coding apparatus for encoding an image signal on the basis of unit blocks containing a plurality of pixel data, said apparatus comprising a coding section for encoding a plurality of pixel data contained in a block and outputting coded data, a pixel exchange section for causing said plurality of blocks to exchange at least a pixel data therebetween and a detecting section for detecting the amount of information produced by said coding section at the time of encoding said plurality of pixel data for the case of existence of exchange of pixel data or the case of non-existence of exchange of pixel data, said coding section being adapted to output the encoded pixel data of said block for the case of existence of exchange of pixel data or the case of non-existence of exchange of pixel data, whichever involving the smaller quantity of information as detected by said detecting section.

According to the invention, there is provided a decoding apparatus for decoding encoded data obtained by dividing an image signal into a plurality of blocks, each containing pixel data, and causing the blocks to exchange at least a pixel data therebetween so as to reduce the amount of encoded information, said apparatus comprising a decoding section for decoding a plurality of pixel data out of the encoded data for each block and a pixel reverse-exchange section for carrying out a reverse-exchange operation of recovering the pixel data exchanged between the blocks for the plurality of pixel data decoded by said decoding section for each block.

According to the invention, there is also provided a coding method for encoding an image signal on the basis of unit blocks containing a plurality of pixel data, said method comprising steps of detecting the amount of information produced at the time of encoding said plurality of pixel data for either the case of existence of exchange of pixel data and the case of non-existence of exchange of pixel data and outputting the encoded pixel data of said block for the case of existence of exchange of pixel data or the case of non-existence of exchange of pixel data, whichever involving the smaller quantity of information.

According to the invention, there is provided a decoding method for decoding encoded data obtained by dividing an image signal into a plurality of blocks, each containing pixel data, and causing the blocks to exchange at least a pixel data therebetween so as to reduce the amount of encoded information, said method comprising steps of decoding a plurality of pixel data out of the encoded data for each block and carrying out a reverse-exchange operation of recovering the pixel data exchanged between the blocks for the plurality of pixel data decoded by said decoding section for each block.

According to the invention, there is provided a recording medium storing a computer-controllable program recorded in it for encoding an image signal on the basis of unit blocks containing a plurality of pixel data, said program comprising steps of detecting the amount of information produced at the time of encoding said plurality of pixel data for either the case of existence of exchange of pixel data and the case of non-existence of exchange of pixel data and outputting the encoded pixel data of said block for the case of existence of exchange of pixel data or the case of non-existence of exchange of pixel data, whichever involving the smaller quantity of information.

According to the invention, there is also provided a recording medium storing a computer-controllable program recorded in it for decoding encoded data obtained by dividing an image signal into a plurality of blocks, each containing pixel data, and causing the blocks to exchange at least a pixel data therebetween so as to reduce the amount of encoded information, said program comprising steps of decoding a plurality of pixel data out of the encoded data for each block and carrying out a reverse-exchange operation of recovering the pixel data exchanged between the blocks for the plurality of pixel data decoded by said decoding section for each block.

BEST MODE FOR CARRYING OUT THE INVENTION

Figure 1:
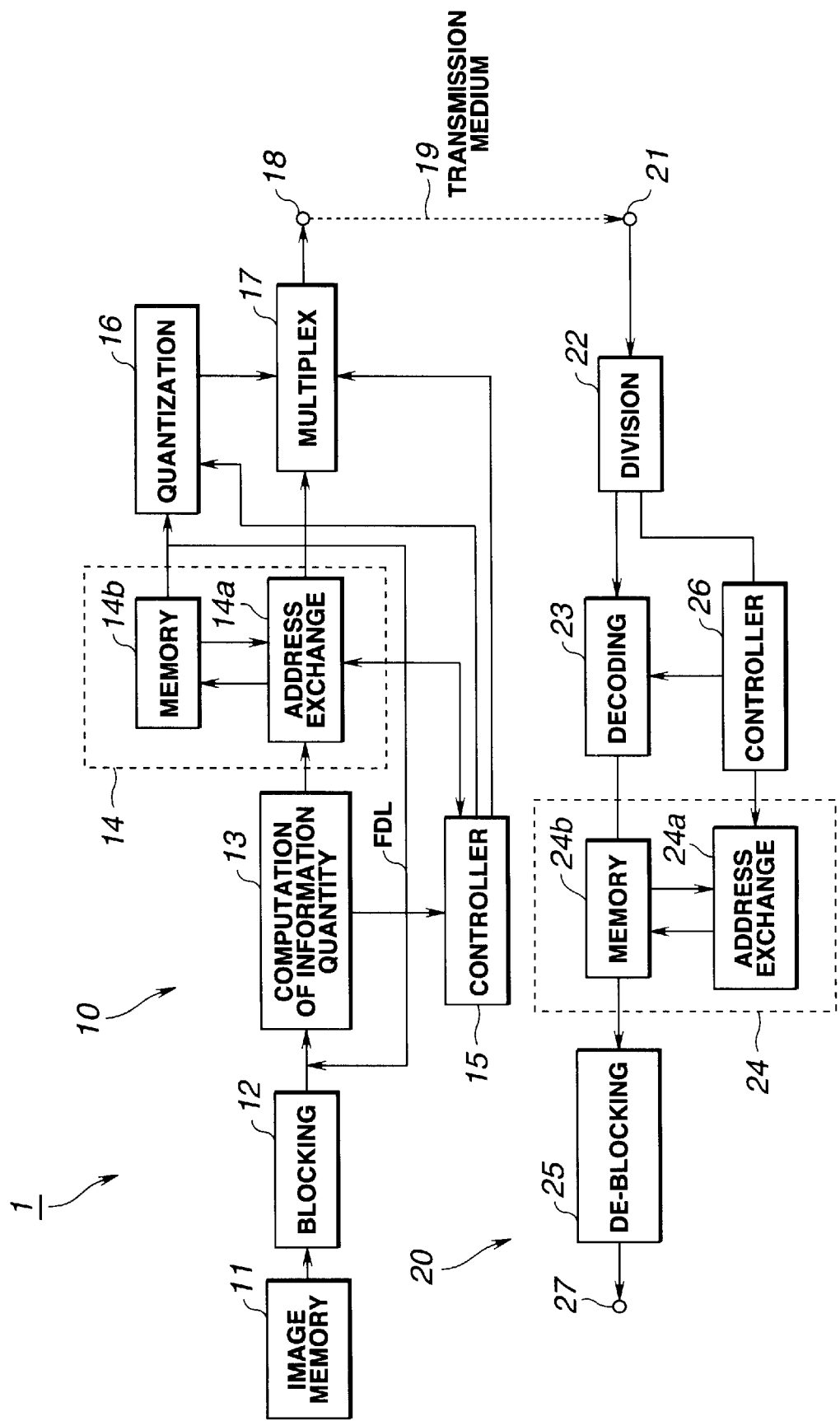
FIG. 1 is a schematic block diagram of an image processing system to which the present invention is applicable.

Now, the present invention will be described by referring to the accompanying drawings that illustrate an image processing system to which the present invention is applied. FIG. 1 is a schematic block diagram of the image processing system 1 comprising a coding apparatus 10 for blocking and encoding a digitized image signal, a transmission medium 19 for transmitting the encoded data coming from the coding apparatus 10 and a decoding apparatus 20 for decoding the encoded and transmitted data.

Firstly, the configuration of the coding apparatus 10 will be discussed below. The coding apparatus 10 comprises a blocking section 12 for dividing the image signal typically read out of image memory 11 into a plurality of unit blocks containing pixel data, a quantizing section 16 for coding the plurality of pixel data in the blocks produced by the blocking section 12 and outputting coded data, a pixel exchange section 14 for causing the plurality of blocks to exchange at least a pixel data therebetween and a quantity of information computing section 13 operating as detecting section for detecting the amount of information produced by the pixel exchange section 14 at the time of encoding the plurality of pixel data for the case of existence of exchange of pixel data or the case of non-existence of exchange of pixel data.

The coding apparatus 10 also comprises a multiplexing section 17 for adding pixel exchange information, which will be described hereinafter, to the coded data from the quantizing section 16 and a controller for controlling the operations of the quantity of information computing section 13, the pixel exchange section 14, the quantizing section 16 and the multiplexing section 17.

While the quantity of information computing section 13 is used to compute the quantity of information in the above description, the quantizing section 16 may be adapted to encode pixel data and compute the quantity of information when there is an exchange of pixel. Then, the quantity of information computing section 13 may be omitted.

The operation of the coding apparatus 10 will be discussed below.

The image signal of each frame read out from the image memory 11 may be divided into a plurality of blocks, each containing 8×8 pixels, by the blocking section 12. Thus, a plurality of blocks, each containing pixels, are formed from each frame. The plurality of blocks are then supplied to the quantity of information computing section 13.

The quantity of information computing section 13 computationally determines the quantity of information for each of the plurality on the basis of adaptive dynamic range coding (ADRC), using Equation (1) below.

quantity of information=bit length of dynamic range(DR)+smallest bit length (MIN)+(bits allocated to a pixel)×(number of pixels in a block)   (formula 1)

In the case of ADRC, bits are assigned to a pixel on the basis of the relationship with the dynamic range DR as shown in Table 1 below, which illustrates an example of assignment of bits to a 4-bit semi-fixed-length ADRC.

TABLE 1

| Dynamic range | Bit assignment |
| --- | --- |
| 0~6 | 0 |
| 7~25 | 1 |
| 26~75 | 2 |
| 76~255 | 3 |

The quantity of information computationally determined by using Table 1 and Equation 1 above is then stored in the memory section arranged in the inside of the quantity of information computing section 13.

The quantity of information is also computationally determined for the observable block that has exchanged pixel data with an object block in the pixel exchange section 14. This will be discussed in greater detail hereinafter.

The pixel exchange section 14 includes an address exchange section 14a and a memory section 14b. It switches the address of an arbitrarily selected image data stored in the memory section 14b between the observable block and the object block and reads the image data from the memory section 14b.

Figure 2A:
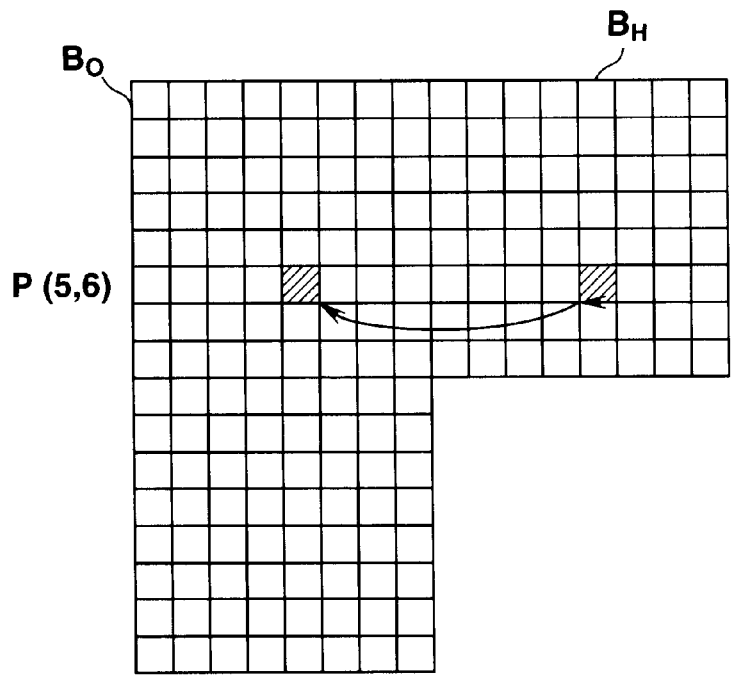
FIG. 2A is a schematic illustration of an exchange of pixel data between an observable block and another block located on a same horizontal line by the coding apparatus of the image processing system of FIG. 1.
Figure 2B:
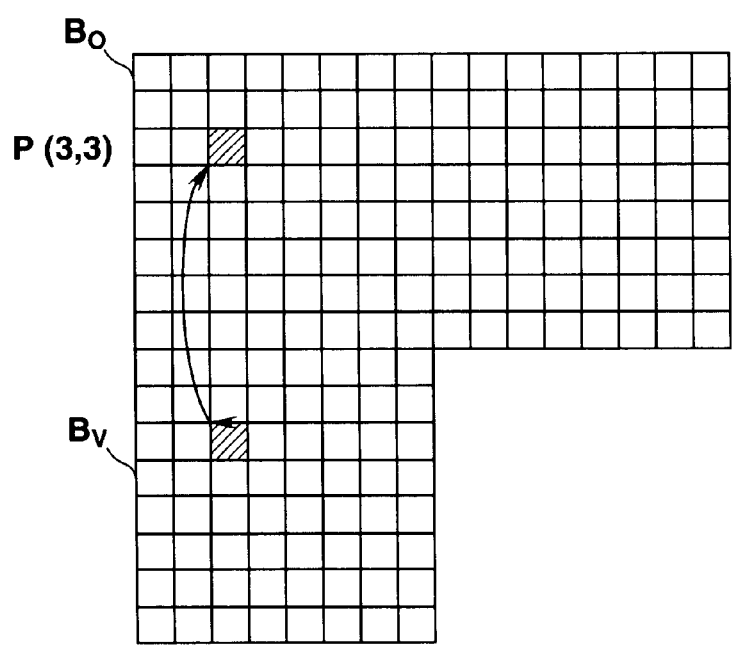
FIG. 2B is a schematic illustration of an exchange of pixel data between an observable block and another block located on a same vertical line by the coding apparatus of the image processing system of FIG. 1.

FIG. 2A schematically illustrates an exchange of pixel data between observable block $B_O$ and object block $B_H$ located adjacently to the right side of the observable block on a same horizontal line, whereas FIG. 2B schematically illustrates an exchange of pixel data between observable block $B_O$ and object block $B_V$ located adjacently below the observable block on a same vertical line. Note that only a pixel selected from the observable block $B_0$ will be exchanged in the embodiment.

While the object block selected out of the plurality of blocks of the image signal of a frame is located adjacently relative to the observable block either on a same horizontal or on a same vertical line in the above example, it may alternatively be selected out of the plurality of blocks of the image signal of a field and located adjacently relative to the observable block either on a same horizontal or on a same vertical line. Still alternatively, it may be selected out of the plurality of blocks of the image signal of a frame or a field and located diagonally upper right, lower left, lower right or upper left relative to the observable block. Still alternatively, it may be a block located adjacent relative to the observable block in a temporal direction. If it is a block located adjacent relative to the observable block in a temporal direction, it may be the block located at the position same as the observable block in the image signal of the immediately preceding frame or the immediately preceding field.

In FIG. 2A, pixel P (5,6) of the observable block $B_O$ is switched with pixel P (5,6) of the object block $B_H$ located adjacently on a same horizontal line. The pixel exchange section 14 switches the read address (5,6) of the pixel P of the observable block $B_O$ and the read address (5,6) of the pixel P of the object block $B_H$. Then, it reads the pixel P of the object block $B_H$ from the memory 14b and replace the pixel P of the observable block $B_O$ with it to realize the exchange of pixels. In FIG. 2B, pixel P (3,3) of the observable block $B_O$ is switched with pixel P (3,3) of the object block $B_V$ located adjacently on a same vertical line. The pixel exchange section 14 switches the read address (3,3) of the pixel P of the observable block $B_O$ and the read address (3,3) of the pixel P of the object block $B_V$. Then, it reads the pixel P of the object block $B_H$ from the memory 14b and replace the pixel P of the observable block $B_O$ with it to realize the exchange of pixels. Hereinafter, the observable block in which a pixel is switched will be referred to as $B_O'$.

The observable block $B_O'$ where a pixel is switched by the pixel exchange section 14 is then fed to the quantity of information computing section 13 by means of feedback loop FDL, which section computationally determines the quantity of information by means of Equation 1 above. Then, the quantity of information of the observable block $B_O'$ where a pixel is switched is compared with the quantity of information of the observable block $B_O$ stored in the memory section before the pixel exchange by the controller 15. If the quantity of information of the observable block $B_O'$ where a pixel is switched is found to be smaller, the observable block $B_O'$ where a pixel is switched if fed to the quantizing section 16. If, on the other hand, the quantity of information of the observable block $B_O$ before the pixel exchange is found to be smaller, the original observable block $B_O$ is fed to the quantizing section 16.

The operation of pixel exchange is carried out by the pixel exchange section 14 for all the 64 pixels of the observable block $B_O$. In each operation, the observable block $B_O'$ where a pixel is exchanged is fed to the quantity of information computing section 13, which then computationally determines the quantity of information, and the controller 15 compares the quantity of information of the observable block $B_O$ stored in the memory section before the pixel exchange and that of the observable block $B_O'$ where a pixel is switched. Then, the block having the smaller quantity of information is fed to the quantizing section 16 regardless if it is the block $B_O$ before the pixel exchange or not.

The above sequence of processing operations including pixel exchanges and computations of quantities of information may be referred to as verification of pixel exchanges because it determines if each pixel exchange should be carried out or not.

The quantizing section 16 encodes the observable block $B_O$ of $B_O'$ fed from the pixel exchange section 14 by means of a semi-fixed length ADRC technique and outputs the coded data. ADRC is a technique of determining the coded bit length depending the size of the dynamic range within the block. Thus, the block may be encoded typically by using a technique of assignment of bits to a 4-bit semi-fixed-length ADRC as illustrated in Table 1 above. Then, the decoding side can decode the block by slicing bits, seeing the transmitted dynamic range DR. The multiplexed bit plane transmitted to the decoding side, which will be discussed in detail hereinafter, is provided not only with the dynamic range but also with the smallest value MIN of the block.

The multiplexing section 17 multiplexes pixel exchange information, which will be described hereinafter, with the coded data transmitted from the quantizing section 16 to produce a multiplexed bit plane. If there is set a requirement that a pixel of the observable block is exchanged with the pixel of the same position of an adjacently located block is to be met, the pixel exchange information may typically contain a 1-bit flag indicating that the pixel is to be switched or not, a bit indicating that the object block is a horizontally or vertically adjacent block and six bits indicating the address (ADDR) at which the pixel to be switched is located in the block (for 64 addresses).

Figure 3A:
FIG. 3A is a schematic illustration of the format of a known bit plane.
Figure 3B:
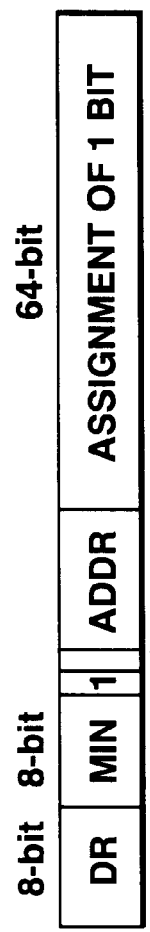
FIG. 3B is a schematic illustration of the format of a bit plane when pixel data are exchanged by the coding apparatus of the image processing system of FIG. 1.
Figure 3C:
FIG. 3C is a schematic illustration of the format of a bit plane when pixel data are not exchanged by the decoding apparatus of the image processing system of FIG. 1.

FIGS. 3B and 3C shows an example of multiplexed bit plane that can be output from the multiplexing section 17. FIG. 3A illustrates a conventional ADRC coding technique conducted on an observable block. Assume that the dynamic range DR is equal to 30. Referring to Table 1, it will be seen that two bits are assigned to the dynamic range DR of 30. Then, the quantity of information of the observable block can be calculated by using Equation 1 and is equal to 8+8+2×64 =144 bits. If, on the other hand, the dynamic range DR of the observable block is reduced to 26 as a result of pixel exchange, the quantity of information of the observable block will be the sum of 64 (1×64) bits assigned on the basis of a bit per address and the above pixel exchange information, or 8+8+1+1+6+64=88 bits. The net result is a significant reduction in the quantity of information. If it is found that the dynamic range DR remains equal to 30 after a pixel exchange, the original block will be used without pixel exchange. Then, the quantity of information will be equal to 8+8+1 +2×64=145 bits as shown in FIG. 3C.

In this way, the coding apparatus 10 of the image processing system 1 of FIG. 1 can intensify the intra-block correlation of the coded blocks to consequently reduce the quantity of information within the blocks in order to achieve an improved coding efficiency.

The bit plane as shown in FIG. 3B or 3C is then transmitted to the decoding apparatus 20 from the output terminal 18 by way of the transmission medium 19 in FIG. 1. The transmission medium 19 may be a communication path such as a communication network or a recording medium such as a disk-shaped recording medium or a tape-shaped recording medium. Thus, the transmission medium 19 can be relieved of a heavy transmission load so that it may have a reduced transmission capacity because the quantity of encoded data to be transmitted is reduced by the image coding method and the image coding apparatus. If a transmission medium 19 having a conventional transmission capacity is used, the encoded data may be multiplexed with other data for transmission.

Referring back to FIG. 1, now the configuration of the decoding apparatus 20 will be described. The decoding apparatus 20 comprises a separator section 22 for separating the coded data from the pixel exchange information contained in the multiplexed bit plane fed in through the input terminal 21, a decoding section 23 for decoding the coded data coming from the separator section 22, a pixel reverse-exchange section 24 for recovering the pixel data exchanged between the blocks, a block decomposing section 25 for decomposing the blocks and a controller 26 for controlling the operation of the decoding section 23 and that of the pixel reverse-exchange section 24. The pixel reverse-exchange section 24 includes an address exchange section 24a and a memory section 24b.

The decoding apparatus 20 operates in a manner as described below.

The multiplexed bit plane as shown in FIG. 3B or 3C that is transmitted by way of the transmission medium 19 and input through the input terminal 21 is firstly fed to the separator section 22, which separates the coded data from the pixel exchange information. Then, the coded data is fed to the decoding section 23, while the pixel exchange information is fed to the controller 26.

The decoding section 23 decodes the coded data on the basis of unit blocks according the dynamic range of the data and sends the decoded data to the memory section 24b of the pixel reverse-exchange section 24 on the basis of unit blocks.

The controller 26 reads the pixel exchange information and recognizes the case of existence of pixel exchange or the case of non-existence of pixel exchange by seeing the 1-bit flag indicating that the pixel is switched or not, whichever appropriate. If the flag is equal to "1", it judges that the coding apparatus 10 carried out an operation of exchanging pixels. Additionally, it recognizes the object block and the position thereof by seeing the one bit indicating that the object block of pixel exchange is the block located adjacently on a same horizontal line or on a same vertical line and the six bits indicating the addresses of the switched pixels within the block. The information on the object block of pixel exchange if it is located adjacently on a same horizontal line or on a same vertical line and on the positions of the switched pixels is sent to the address exchange section 24a of the pixel reverse-exchange section 24.

If, on the other hand, the 1-bit flag indicating that the pixel is switched or not is equal to "0", the controller 26 judges that the coding apparatus 10 did not carry out any operation of exchanging pixels. Then, it notifies the pixel reverse-exchange section 24 of its judgment.

Thus, the pixel reverse-exchange section 24 carries out an operation of reverse-exchange only for the blocks stored in the memory 24b that require a pixel exchange out of the data to be decoded on the basis of unit blocks. In other words, it does not carry out any operation of reverse-exchange for the blocks that do not require any pixel exchange.

Finally, the block decomposing section 25 decomposes the blocks and the decoded image data of 64 pixels are delivered through the output terminal 27.

As described above, the decoding apparatus 20 decodes the transmitted data in a conventional manner if it is determined that the blocks do not contain any switched pixels on the basis of the flag but carries out an operation of reverse-exchange for each of the switched pixels to restore the pixel to the position to be displayed according to the pixel exchange information by means of the pixel reverse-exchange section 24. Then, it delivers the decoded image data by way of the block decomposing section 25 and the output terminal 27.

Thus, with the image processing system 1 of FIG. 1, the coded data from the coding apparatus 10 can be decoded with ease by the decoding apparatus 20 having a simple configuration.

Now, another embodiment of coding apparatus and that of decoding apparatus according to the invention will be described by referring to the drawings.

Figure 4:
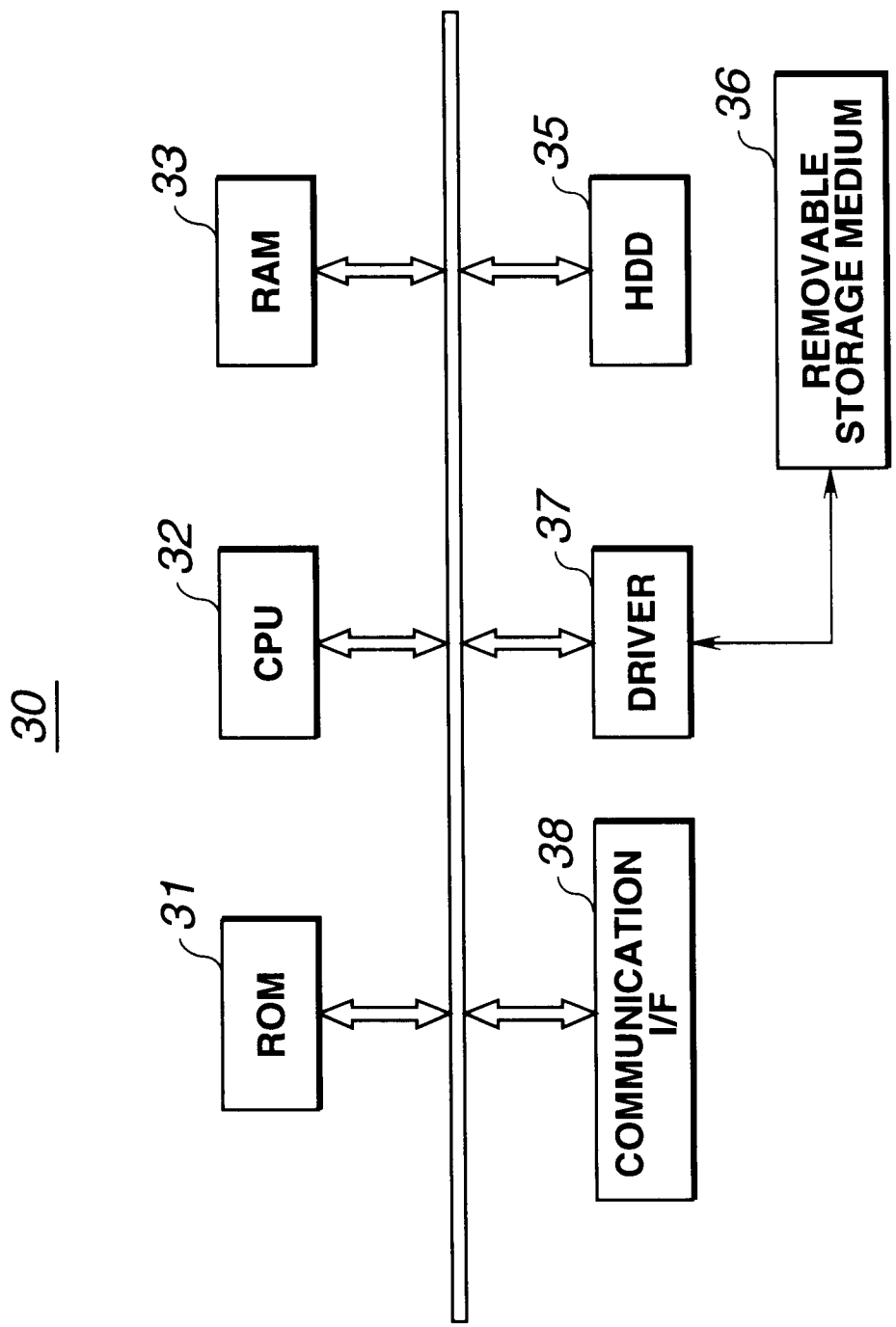
FIG. 4 is a schematic illustration of an information processing apparatus connected to an external storage apparatus to which first and second embodiments of recording medium according to the invention is applicable.

Firstly an embodiment of coding apparatus according to the invention will be discussed by referring to FIGS. 4 through 6.This embodiment is in fact an information processing apparatus 30 adapted to execute a computer-controllable coding program for encoding an image signal on the basis of unit blocks containing a plurality of image data as illustrated in FIG. 4. The coding program may be stored in advance in an internal recording medium or down-loaded internally by way of a removable recording medium such as a floppy disk. In any case, the information processing apparatus 30 operates as coding apparatus as it executes the coding program.

Now, the configuration of the information processing apparatus 30 will be discussed in detail below. CPU (central processing unit) 32 is connected to a ROM 31, a RAM 33, a communication I/F 38, a driver 37 and an HDD 35 by way of a bus 34.The driver 37 drives a removable storage medium 36 that may be a PC card, a CD-ROM or a floppy disk (FD).

The ROM 31 typically stores an IPL (initial program loading) program. The CPU 32 executes the OS (operating system) program stored in the HDD 35 according to the IPL program stored in the ROM 31 and also executes the coding program typically stored in the HDD 35 under the control of the OS. The RAM 33 temporarily stores programs and data necessary for the operation of the CPU 32.The communication I/F 38 is used for the purpose of communication with external devices. From the viewpoint of the system of FIG. 1, it is equivalent to the interface connected to the transmission medium 19 for transmitting a multiplexed bit plane to the decoding apparatus 20. As will be described hereinafter, it is also used as interface for receiving a coding program by way of a network.

The coding program has steps for detecting the amount of information generated for coding a plurality of image data of the observable block and indicating either that there exists an exchange of at least a pixel data between the observable block and the object block or that there doe not exist any exchange of pixel data between the blocks and outputting the coded image data of the observable block containing a smaller quantity of information to indicate that there exists an exchange of pixel data or there does not exists any exchange of pixel data, whichever appropriate.

The CPU 32 takes out the coding program typically from of the HDD 35 and executes it, using the RAM 33 as work storage. Now, the operation of executing the coding program of the CPU 32 of the information processing apparatus 30 when it takes out the program from the HDD 35 will be discussed below by referring to FIG. 5.

Firstly, the CPU 32 divided the image signal of a frame read out of the image memory 11 into blocks, each having 8×8 pixels (Step S1). The image memory 11 may be a RAM 32 or a removable recording medium 36 with which the driver 37 is equipped. Alternatively, it may be so arranged that the CPU 32 reads out an image signal from a remote image memory or a server by way of the communication I/F 38 and a network.

Then, the CPU 32 goes through a process of verifying if it is better to realize a pixel exchange or not (Step S2).

This process of verifying a pixel exchange includes an operation of computing the quantity of information on the basis of ADRC for the plurality of blocks by means of Equation 1 above, that of switching an arbitrarily selected pixel of the observable block with a corresponding pixel of the object block by reading the address of the latter for the former, and that of comparing the quantity of information of the original block with the computed quantity of information of the block processed for pixel exchange. The contents of the block to be sent for the process of quantization in Step S3 will vary depending on the result of the comparison.

Figure 6:
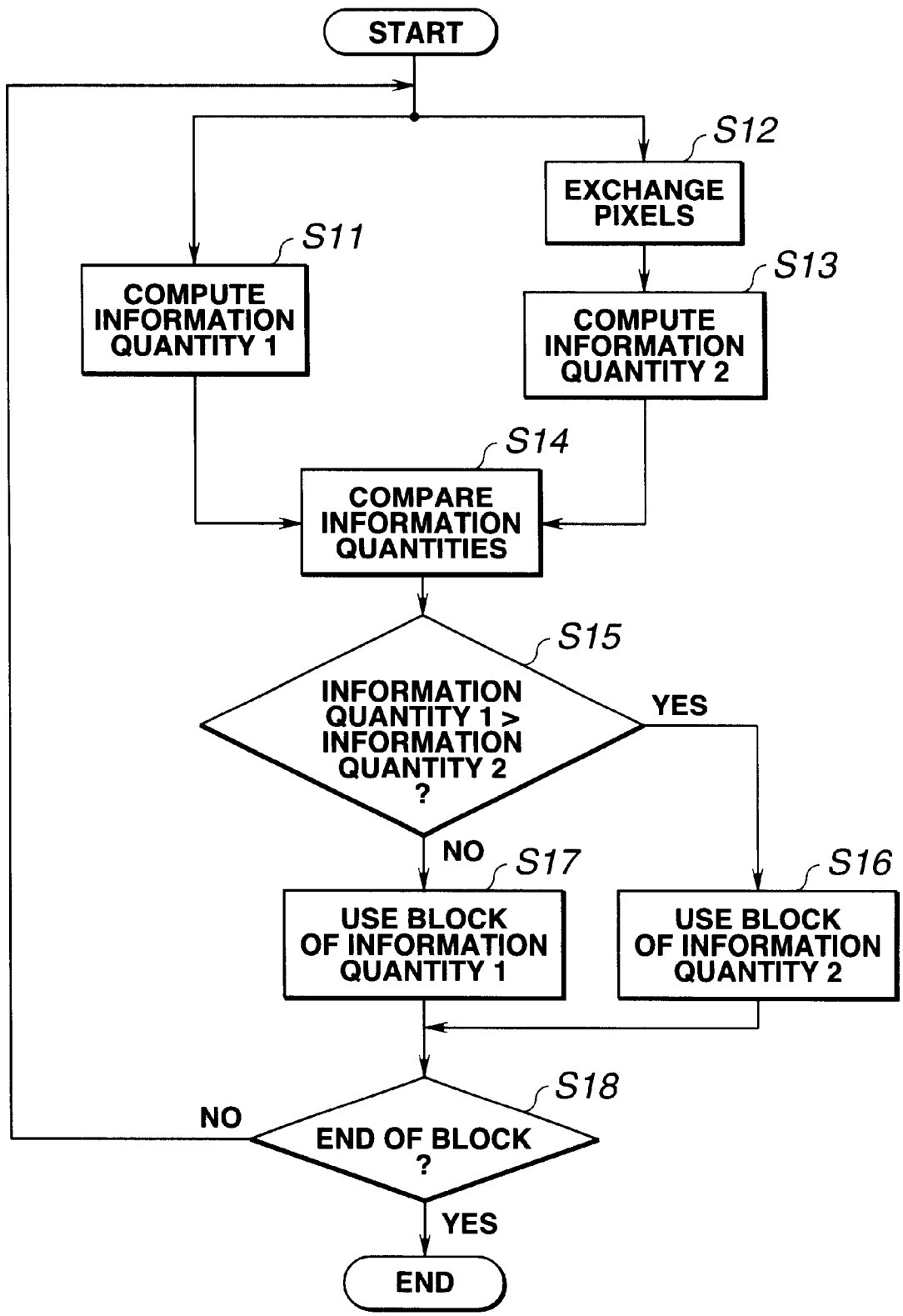
FIG. 6 is a flow chart of the process of verifying a pixel exchange of the coding program of FIG. 5.

FIG. 6 illustrates in detail the process of verifying a pixel exchange to be carried out by the CPU 32 according to the coding program typically stored in the HDD 35.

In Step S11, the CPU 32 computes the quantity of information for a plurality of blocks on the basis of the ADRC by using Equation 1 and Table 1 above. For the convenience of explanation, assume here that the CPU 32 computes in advance the quantity of information 1 of the observable block $B_O$. Then, it stores the quantity of information 1 in the RAM 33.

On the other hand, as shown in FIG. 2, the CPU switches pixels between the observable block $B_O$ and the object block $B_H$ located adjacently to the right side of the observable block on a same horizontal line or the object block $B_V$ located adjacently below the observable block on a same vertical line (Step S12) and computationally determines the quantity of information 2 of the observable block $B_O'$ where the pixel is switched also by using Equation 1 and Table 1 above (Step S13). The operation of pixel exchange is carried out by the CPU 32 for all the 64 pixels of the observable block $B_O$. In each operation, the CPU 32 computationally determines the quantity of information of the observable block $B_O{'}$ where the pixel is switched.

Then, in Step S14, the CPU 32 compares the quantity of information 1 determined in Step S12 and the quantity of information 2 of the observable block $B_O$ determined in Step S13 after the pixel exchange. Then, in Step S15, finalizes the result of the comparison and, if the quantity of information (quantity of information 2) of the observable block $B_O{'}$ after the pixel exchange is smaller, it sends out the observable block $B_O{'}$ after the pixel exchange for an operation of quantification (Step S3 in FIG. 5) (Step S16). If, on the other hand, the quantity of information (quantity of information 1) of the observable block $B_O$ before the pixel exchange, it sends out the original observable block $B_O$ for an operation of quantification (Step S17).

The operations of Steps S11 through S17 are carried out repeatedly for all the blocks of the image signal read out of the image memory 11 (Step S18).

Figure 5:
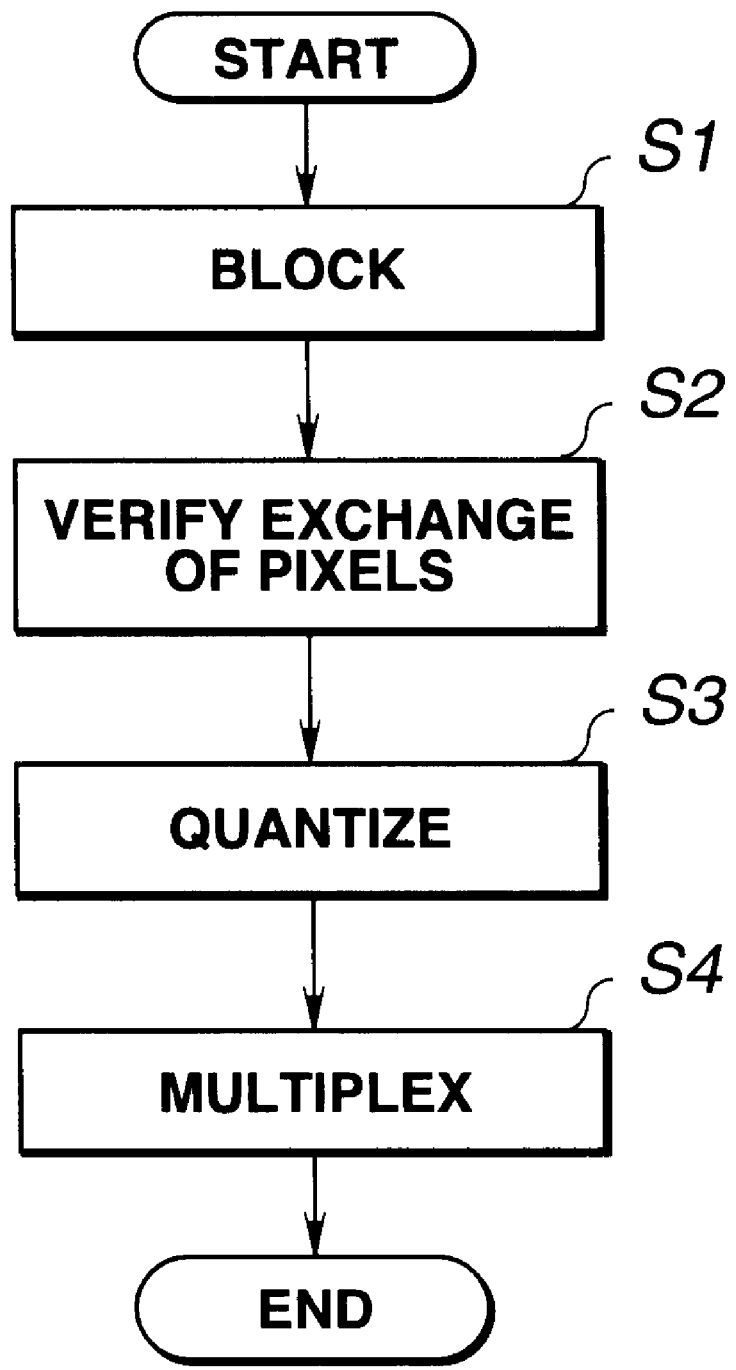
FIG. 5 is a flow chart of the coding program stored in the recording medium of the information processing apparatus of FIG. 4.

After the above described pixel exchange verging process (Step S2 in FIG. 5), the CPU 32 carries out a quantization process (Step S3) as shown in FIG. 5. This quantization process is a coding process conducted by the CPU 32 on the observable block $B_O$ or $B_O{'}$ after the pixel exchange verifying process by using a semi-fixed length ADRC technique and then the CPU 32 output coded data.

Finally, the CPU 32 carries out a multiplexing process in Step S4, where it multiplexes the coded data obtained after the quantization process and the above pixel exchange information to produce a multiplexed bit plane.

As described above, as the CPU 32 executes the coding program, the information processing apparatus 30 operates same as the above described coding apparatus 10. To be more accurate, the information processing apparatus 30 can operates for coding blocks with an improved coding efficiency and a reduced quantity of information for the inside of the block without requiring the use of hardware having a configuration as shown in FIG. 1 by executing the coding program typically stored in the HDD 35.

The above described coding program may alternatively be stored in the ROM 31. Still alternatively, it may be stored in a removable storage medium 36 such as a PC card, a CD-ROM or a floppy disk (FD) and down-loaded onto and stored in the HDD 35 or the RAM 33 by way of the driver 37 when it is used. Still alternatively, it may be down-loaded onto and stored in the HDD 35 or the RAM 33 from a network by way of the communication I/F 38.

Figure 7:
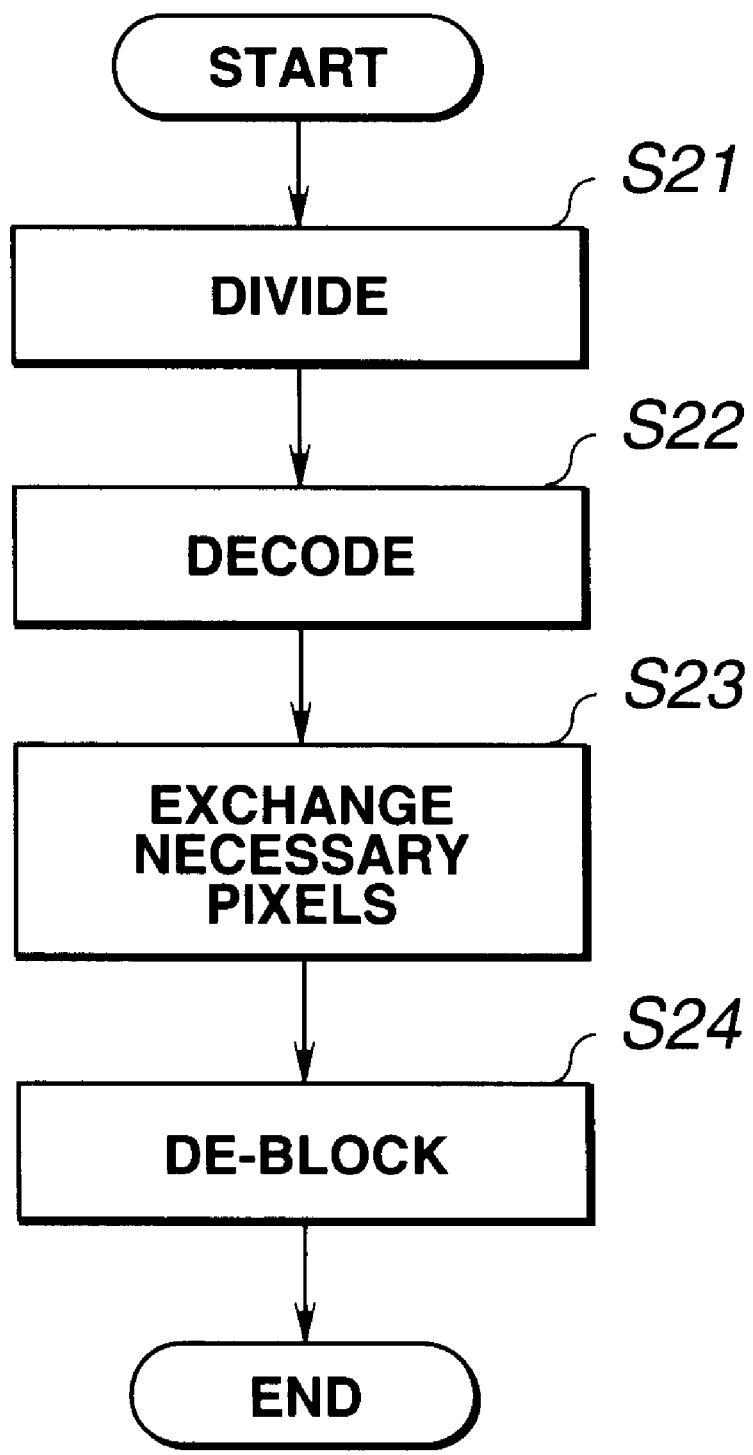
FIG. 7 is a flow chart of the decoding program stored in the recording medium of the information processing apparatus of FIG. 4.

Now, another embodiment of decoding apparatus according to the invention will be described by referring to FIGS. 4 and 7. This embodiment of decoding apparatus is in fact an information processing apparatus 30 adapted to execute a computer-controllable decoding program for decoding encoded data obtained by dividing an image signal into a plurality of blocks, each containing pixel data, and causing the blocks to exchange at least a pixel data therebetween so as to reduce the amount of encoded information. The decoding program may be stored in advance in an internal recording medium or down-loaded internally by way of a removable recording medium such as a floppy disk. In any case, the information processing apparatus 30 operates as coding apparatus as it executes the coding program.

While the basic configuration of the information processing apparatus 30 would not be described any further there, it is different from the above described coding apparatus 10 and information processing apparatus operating similarly as the coding apparatus 10 in that the communication I/F 38 is used for receiving the multiplexed bit plane transmitted to the apparatus by way of the transmission medium 19.

The decoding program has steps for decoding a plurality of pixel data for each of the blocks of the coded data and carries out a reverse-exchange operation for restoring the pixel data switched between blocks for the decoded plurality of pixel data of each of the blocks.

The CPU 32 takes out the decoding program typically from of the HDD 35 and executes it, using the RAM 33 as work storage. Now, the operation of executing the decoding program of the CPU 32 of the information processing apparatus 30 when it takes out the progbasis of unit blocks from the HDD 35 will be discussed below by referring to FIG. 7.

Firstly, the CPU 32 divided the multiplexed bit plane to separate the coded data and the pixel exchange information (Step S21). Then, in Step S22, the CPU 32 carries out an operation of decoding the coded data on the basis of unit blocks according to the dynamic range DR to produce decoded data on the basis of unit blocks.

Then, in Step S32, the CPU 32 recognizes the case of existence of pixel exchange or the case of non-existence of pixel exchange by seeing the 1-bit flag indicating that the pixel is switched or not, whichever appropriate. If the flag is equal to "1", it judges that the coding apparatus 10 or the similar information processing apparatus carried out an operation of exchanging pixels. Additionally, it recognizes the object block and the position thereof by seeing the one bit indicating that the object block of pixel exchange is the block located adjacently on a same horizontal line or on a same vertical line and the six bits indicating the addresses of the switched pixels within the block. If, on the other band, the 1-bit flag indicating that the pixel is switched or not is equal to "0", the CPU 32 judges that the coding apparatus 10 or the similar information processing apparatus did not carry out any operation of exchanging pixels. Thus, the CPU 32 carries out an operation of reverse-exchange of pixels whenever the latter require such operation (Step Se).

Finally, the CPU 32 decomposes the blocks in Step SD to obtain the decoded image data that are composed of 64 pixels.

As described above, the information processing apparatus 30 operates like the decoding apparatus 20 described earlier as the CPU 32 executes the decoding progbasis of unit blocks. The information processing apparatus 30 does not requires the use of hardware having a configuration as illustrated in FIG. 1 because the CPU 32 executes the coding progbasis of unit blocks typically stored in the HDD 35 and still it can decode the image data in a conventional manner when there is no pixel exchange in the block according to the flag and by carrying out a reverse-exchange operation according to the pixel exchange information if there is a pixel exchange in the block according to the flag in order to restore the original pixel to the proper position. Then, it decomposes the blocks and produce the decoded image data.

The above described decoding program may alternatively be stored in the ROM 31. Still alternatively, it may be stored in a removable storage medium 36 such as a PC card, a CD-ROM or a floppy disk (FD) and down-loaded onto and stored in the HDD 35 or the RAM 33 by way of the driver 37 when it is used. Still alternatively, it may be down-loaded onto and stored in the HDD 35 or the RAM 33 from a network by way of the communication I/F 38.

INDUSTRIAL APPLICABILITY

Thus, a coding apparatus according to the invention can intensify the intra-block correlation of the coded blocks at the time of blocking and encoding an image signal to consequently reduce the quantity of information within the blocks in order to achieve an improved coding efficiency. A decoding apparatus according to the invention has a simple configuration and can decode the coded data from the coding apparatus with ease.

When the coding program stored in a recording medium according to the invention is executed by means of an information processing apparatus, it can intensify the intra-block correlation of the coded blocks at the time of blocking and encoding an image signal with an improved coding efficiency and a reduced quantity of information without requiring the use of hardware.

Finally, when the decoding processing stored in a recording medium according to the invention is executed by means of an information processing apparatus, the coded data from the coding apparatus can be decoded with ease without requiring the use of hardware

What is claimed is:

1. A coding apparatus for encoding an image signal on the basis of unit blocks containing a plurality of pixel data, said apparatus comprising:
   a coding section for encoding a plurality of pixel data contained in a block and outputting coded data;
   a pixel exchange section for causing said plurality of blocks to exchange at least a pixel data therebetween; and
   a detecting section for detecting the quantity of information produced by said coding section at the time of encoding said plurality of pixel data for the case of existence of exchange of pixel data or the case of non-existence of exchange of pixel data;
   said coding section being adapted to output the encoded pixel data of said block for the case of existence of exchange of pixel data or the case of non-existence of exchange of pixel data, whichever involving the smaller quantity of information as detected by said detecting section.

2. A coding apparatus according to claim 1, wherein said coding section quantizes the pixel data in said blocks.

3. A coding apparatus according to claim 2, wherein said coding section quantizes the plurality of pixel data in said blocks by means of the numeral of bits of quantization as determined on the dynamic range of the values of the plurality of pixel data in the blocks.

4. A coding apparatus according to claim 1, wherein said pixel exchange section causes said blocks of a same frame or a same field to exchange pixel data.

5. A coding apparatus according to claim 1, wherein said pixel exchange section causes said blocks of adjacent blocks to exchange pixel data.

6. A coding apparatus according to claim 1, wherein said pixel exchange section causes said blocks to exchange pixel data located at a same position thereof.

7. A coding apparatus according to claim 1, wherein said detecting section detects said quantity of information on the basis of the correlation of the plurality of pixel data in each of said blocks.

8. A coding apparatus according to claim 7, wherein said quantity of information is detected for said correlation on the basis of the dynamic range of the plurality of pixel data in each of said blocks and said coding section quantizes said plurality of pixel data in each of said blocks by means of the number of bits of quantization determined on the basis of said dynamic range.

9. A coding apparatus according to claim 1, wherein said coded data include pixel exchange information relating to the exchange of pixel data.

10. A coding apparatus according to claim 9, wherein said pixel exchange information includes positional information indicating the position of the exchanged pixel data in the blocks.

11. A coding apparatus according to claim 9, wherein said pixel exchange information includes block information indicating the block with which the pixel data are exchanged.

12. A coding apparatus according to claim 9, wherein said pixel exchange information includes exchange information indicating the existence or non-existence of exchange of pixel data.

13. A coding apparatus according to claim 1, wherein said coding section makes said coded data include information indicating the existence of exchange of pixel data provided that said pixel exchange section carries out a pixel exchange.

14. A coding apparatus according to claim 1, wherein said coding section makes said coded data include information indicating if said pixel exchange section carries out a pixel exchange or not.

15. A coding apparatus according to claim 1, wherein said coding section makes said coded data include information indicating the block with which the pixel data are exchanged provided that said pixel exchange section carries out a pixel exchange.

16. A coding apparatus according to claim 1, wherein said detecting section detects the exchange of pixel data with the smallest quantity of information out of the exchanges of all the pixel data between said blocks conducted on a pixel data by pixel data basis.

17. A decoding apparatus for decoding encoded data obtained by dividing an image signal into a plurality of blocks, each containing pixel data, and causing the blocks to exchange at least a pixel data therebetween so as to reduce the amount of encoded information, said apparatus comprising:
   a decoding section for decoding a plurality of pixel data out of the encoded data for each block; and
   a pixel reverse-exchange section for carrying out a reverse-exchange operation of recovering the pixel data exchanged between the blocks for the plurality of pixel data decoded by said decoding section for each block.

18. A decoding apparatus according to claim 17, wherein said encoded data include pixel exchange information relating to the exchange of pixel data and said pixel reverse-exchange section carries out said reverse-exchange operation on the basis of said pixel exchange information.

19. A decoding apparatus according to claim 18, wherein said pixel exchange information includes positional information indicating the position of the exchanged pixel data in the blocks and said decoding section caries out said reverse-exchange operation for the pixel detected on the basis of said positional information.

20. A decoding apparatus according to claim 18, wherein said pixel exchange information includes block information indicating the block with which the pixel data are exchanged and said decoding section carries ut said reverse-exchange operation with the block detected on the basis of said block information.

21. A decoding apparatus according to claim 18, wherein said pixel exchange information includes exchange information indicating the existence or non-existence of exchange of pixel data and said decoding section carries out said reverse-exchange operation only when said exchange information indicates the existence of exchange of pixel data.

22. A coding method for encoding an image signal on the basis of unit blocks containing a plurality of pixel data, said method comprising steps of:

detecting the quantity of information produced at the time of encoding said plurality of pixel data of a block for either the case of existence of exchange of pixel data between the blocks or the case of non-existence of exchange of pixel data between the blocks; and output the encoded pixel pixel data of said block for the case of existence of exchange of pixel data or the case of non-existence of exchange of pixel data, whichever involving the smaller quantity of information.

23. A decoding method for decoding encoded data obtained by dividing an image signal into a plurality of blocks, each containing pixel data, and causing the blocks to exchange at least a pixel data therebetween so as to reduce the amount of encoded information, said method comprising steps of:

decoding a plurality of pixel data out of the encoded data for each block; and carrying out a reverse-exchange operation of recovering the pixel data exchanged between the blocks for the plurality of pixel data decoded by said decoding section for each block.

24. A recording medium storing a computer-controllable program recorded in it for encoding an image signal on the basis of unit blocks containing a plurality of pixel data;

said program comprising steps of:

detecting the quantity of information produced at the time of encoding said plurality of pixel data of a block for either the case of existence of exchange of pixel data between the blocks or the case of non-existence of exchange of pixel data between the blocks; and output the encoded pixel data of said block for the case of existence of exchange of pixel data or the case of non-existence of exchange of pixel data, whichever involving the smaller quantity of information.

25. A recording medium storing a computer-controllable program recorded in it for decoding encoded data obtained by dividing an image signal into a plurality of blocks, each containing pixel data, and causing the blocks to exchange at least a pixel data therebetween so as to reduce the amount of encoded information;

said program comprising steps of:

decoding a plurality of pixel data out of the encoded data for each block; and carrying out a reverse-exchange operation of recovering the pixel data exchanged between the blocks for the plurality of pixel data decoded by said decoding step section for each block.

* * * * *